US011875434B2

(12) United States Patent
Yang et al.

(10) Patent No.: US 11,875,434 B2
(45) Date of Patent: *Jan. 16, 2024

(54) SYSTEMS AND METHODS FOR CORRECTING PROJECTION IMAGES IN COMPUTED TOMOGRAPHY IMAGE RECONSTRUCTION

(71) Applicant: SHANGHAI UNITED IMAGING HEALTHCARE CO., LTD., Shanghai (CN)

(72) Inventors: Hongcheng Yang, Shanghai (CN); Jianwei Zhu, Shanghai (CN); Haining Sun, Shanghai (CN); Jonathan Maltz, Houston, TX (US)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/062,001

(22) Filed: Dec. 5, 2022

(65) Prior Publication Data
US 2023/0100281 A1 Mar. 30, 2023

Related U.S. Application Data

(63) Continuation of application No. 17/158,030, filed on Jan. 26, 2021, now Pat. No. 11,521,336, which is a (Continued)

(30) Foreign Application Priority Data
Nov. 5, 2018 (CN) .......................... 201811306943.1

(51) Int. Cl.
*G06T 11/00* (2006.01)

(52) U.S. Cl.
CPC .......... *G06T 11/008* (2013.01); *G06T 11/005* (2013.01); *G06T 2211/424* (2013.01)

(58) Field of Classification Search
USPC ....................................................... 382/131
See application file for complete search history.

(56) References Cited

U.S. PATENT DOCUMENTS

2002/0065611 A1    5/2002   Boehm et al.
2003/0007601 A1    1/2003   Jaffray et al.
(Continued)

FOREIGN PATENT DOCUMENTS

CN    103679642 A    3/2014
CN    104605882 A    5/2015
(Continued)

OTHER PUBLICATIONS

International Search Report in PCT/CN2018/087884 dated Aug. 15, 2018, 4 pages.
(Continued)

*Primary Examiner* — Ali Bayat
(74) *Attorney, Agent, or Firm* — METIS IP LLC

(57) ABSTRACT

A method for correcting projection images in CT image reconstruction is provided. The method may include obtaining a plurality of projection images of a subject. Each of the plurality of projection images may correspond to one of the plurality of gantry angles. The method may further include correcting a first projection image of the plurality of projection images according to a process for generating a corrected projection image. The process may include performing, based on the first projection image and a second projection image of the plurality of projection images, a first correction on the first projection image to generate a preliminary corrected first projection image. The process may also include performing, based on at least part of the (Continued)

preliminary corrected first projection image, a second correction on the preliminary corrected first projection image to generate a corrected first projection image corresponding to the first gantry angle.

20 Claims, 11 Drawing Sheets

Related U.S. Application Data continuation of application No. 16/252,826, filed on Jan. 21, 2019, now Pat. No. 10,922,856, which is a continuation of application No. PCT/CN2018/087884, filed on May 22, 2018, which is a continuation-in-part of application No. PCT/CN2017/110032, filed on Nov. 8, 2017.

(56) References Cited

U.S. PATENT DOCUMENTS

| | | | |
|---|---|---|---|
| 2004/0136490 A1 | 7/2004 | Edic et al. | |
| 2010/0054562 A1* | 3/2010 | Berkus | G06T 11/005 382/131 |
| 2010/0124312 A1 | 5/2010 | Enomoto et al. | |
| 2010/0316183 A1 | 12/2010 | Fuchs et al. | |
| 2011/0075908 A1 | 3/2011 | Kanagawa et al. | |
| 2011/0075910 A1 | 3/2011 | Kanagawa et al. | |
| 2011/0142312 A1* | 6/2011 | Toth | A61B 6/482 382/131 |
| 2012/0051504 A1 | 3/2012 | Ohta et al. | |
| 2012/0087481 A1 | 4/2012 | Litvin et al. | |
| 2012/0150520 A1 | 6/2012 | Vaillant et al. | |
| 2012/0177272 A1 | 7/2012 | Suzuki et al. | |
| 2014/0270450 A1* | 9/2014 | Grass | G06F 18/22 382/131 |
| 2015/0103972 A1* | 4/2015 | Bredno | A61B 6/583 378/7 |
| 2015/0164455 A1 | 6/2015 | Yamamura et al. | |
| 2015/0190106 A1 | 7/2015 | Yamakawa et al. | |
| 2015/0348258 A1* | 12/2015 | Petschke | A61B 6/5258 378/19 |
| 2016/0239971 A1 | 8/2016 | Yu et al. | |
| 2017/0055928 A1 | 3/2017 | Taron et al. | |
| 2017/0251995 A1 | 9/2017 | Ni et al. | |
| 2018/0325485 A1* | 11/2018 | Maslowski | A61B 6/483 |
| 2019/0049605 A1 | 2/2019 | Dong | |

FOREIGN PATENT DOCUMENTS

| | | |
|---|---|---|
| CN | 105078402 A | 11/2015 |
| JP | 5697970 B2 | 4/2015 |
| JP | 2017113084 A | 6/2017 |

OTHER PUBLICATIONS

Written Opinion in PCT/CN2018/087884 dated Aug. 15, 2018, 4 pages.
International Search Report in PCT/CN2017/110032 dated Aug. 20, 2018, 5 pages.
Written Opinion in PCT/CN2017/110032 dated Aug. 20, 2018, 4 pages.
First Office Action in Chinese Application No. 201811306943.1 dated Dec. 1, 2021, 26 pages.
D. E. Hyde et al., SBRT of the Spine: Patient Immobilization and Motion Correction, International Journal of Radiation Oncology, Biology, Physics, 78(3): S773-S774, 2010.

* cited by examiner

500

```
┌─────────────────────────────────────────────────────────────┐
│ Obtaining a plurality of projection images of a subject, the │
│ plurality of projection images being generated according to │ ⟋ 510
│ scan data acquired by a CT scanner at a plurality of gantry │
│                          angles                              │
└─────────────────────────────────────────────────────────────┘
                              │
                              ▼
┌─────────────────────────────────────────────────────────────┐
│   Preprocessing the plurality of projection images to        │
│  generate a plurality of preprocessed projection images      │ ⟋ 520
│      corresponding to the plurality of gantry angles         │
└─────────────────────────────────────────────────────────────┘
                              │
                              ▼
┌─────────────────────────────────────────────────────────────┐
│  Correcting the plurality of preprocessed projection images  │
│ corresponding to the plurality of gantry angles to generate  │ ⟋ 530
│         a plurality of corrected projection images           │
└─────────────────────────────────────────────────────────────┘
                              │
                              ▼
┌─────────────────────────────────────────────────────────────┐
│   Reconstructing a CT image of the subject based on the     │ ⟋ 540
│         plurality of corrected projection images             │
└─────────────────────────────────────────────────────────────┘
```

FIG. 5

SYSTEMS AND METHODS FOR CORRECTING PROJECTION IMAGES IN COMPUTED TOMOGRAPHY IMAGE RECONSTRUCTION

CROSS-REFERENCE TO RELATED APPLICATION

This application is a continuation of U.S. patent application Ser. No. 17/158,030, filed on Jan. 26, 2021, which is a continuation of U.S. patent application Ser. No. 16/252,826 (now U.S. Pat. No. 10,922,856), filed on Jan. 21, 2019, which claims priority of International Application No. PCT/CN2018/087884, filed on May 22, 2018, and International Application No. PCT/CN2017/110032, filed on Nov. 8, 2017, and Chinese Patent Application No. 201811306943.1, filed on Nov. 5, 2018. Each of the above-referenced applications is incorporated herein by reference in its entirety.

TECHNICAL FIELD

The present disclosure generally relates to computed tomography (CT) techniques, and more particularly, relates to systems and methods for correcting projection images in CT image reconstruction.

BACKGROUND

CT techniques are widely used in clinical examinations and medical diagnoses in recent years. During a CT scan of a subject, the X-ray imaging source and the detector may rotate with the gantry around the subject to scan the subject at a plurality of gantry angles. Then a plurality of projection images corresponding to the gantry angles may be generated based on the scan data. However, the radiation dose delivered to the subject may fluctuate when the gantry rotates, which may lead to an inconsistency between the projection images. For example, the fluctuations of the radiation dose delivered to the subject may result in a difference between the actual gray values and ideal gray values of the projection images corresponding to the plurality of gantry angles. When a CT image of the subject is reconstructed based on the projection images, the CT image may have a poor imaging quality, which may cause a false medical diagnosis or an inaccurate treatment positioning. Thus, it is desirable to correct and/or normalize the projection images to reduce the effect of the uneven radiation doses at different gantry angles.

SUMMARY

In one aspect of the present disclosure, a system is provided. The system may include a storage device, and at least one processor in communication with the storage device. The storage device may store a set of instructions. When executing the set of instructions, the at least one processor may be configured to cause the system to obtain a plurality of projection images of a subject. The plurality of projection images may be generated according to scan data acquired by a CT scanner at a plurality of gantry angles. Each of the plurality of projection images may correspond to one of the plurality of gantry angles. The at least one processor may be further configured to cause the system to correct a first projection image of the plurality of projection images according to a process for generating a corrected projection image. The first projection image may correspond to a first gantry angle of the plurality of gantry angles. The process may include performing, based on the first projection image corresponding to the first gantry angle and a second projection image of the plurality of projection images, a first correction on the first projection image to generate a preliminary corrected first projection image. The second projection image may correspond to a second gantry angle of the plurality of gantry angles. The process may further include performing, based on at least part of the preliminary corrected first projection image, a second correction on the preliminary corrected first projection image to generate a corrected first projection image corresponding to the first gantry angle.

In some embodiments, the at least one processor may be further configured to cause the system to correct the plurality of projection images to generate a plurality of corrected projection images according to the process for generating a corrected projection image, and reconstruct a CT image of the subject based on the plurality of corrected projection images.

In some embodiments, to correct the plurality of projection images, the at least one processor may be further configured to cause the system to perform one or more iterations. Each current iteration of the one or more iterations may include correcting the plurality of projection images in the current iteration to generate a plurality of corrected projection images according to the process for generating a corrected projection image, and determining whether the plurality of corrected projection images in the current iteration satisfy a condition. Each current iteration may also include in response to a result of the determination that the plurality of corrected projection images fail to satisfy the condition, designating the plurality of corrected projection images in the each current iteration as the plurality of projection images in a next iteration.

In some embodiments, the second gantry angle may be a neighboring gantry angle of the first gantry angle.

In some embodiments, the performing the first correction on the first projection image may include determining a first correction coefficient of the first projection image based on a difference between the first projection image and the second projection image, and generating the preliminary corrected first projection image based on the first correction coefficient and the first projection image.

In some embodiments, the difference between the first projection image and the second projection image may be a difference between grey information of the first projection image and grey information of the second projection image.

In some embodiments, the performing the second correction on the preliminary corrected first projection image may include identifying one or more pixels in the preliminary corrected first projection image, and identifying an opposite pixel corresponding to each pixel of the one or more pixels. The identified one or more pixels may correspond to a middle-channel of the CT scanner at the first gantry angle. The performing the second correction on the preliminary corrected first projection image may also include generating, based on the one or more opposite pixels of the one or more pixels, a reference image of the preliminary corrected first projection image. The performing the second correction on the preliminary corrected first projection image may further include determining a second correction coefficient of the preliminary corrected first projection image based on a difference between the identified one or more pixels and the reference image, and generating the corrected first projection image corresponding to the first gantry angle based on the second correction coefficient and the preliminary corrected first projection image.

In some embodiments, the generating the preliminary first corrected projection image may include preprocessing the first projection image to generate a preprocessed first projection image, and performing the first correction on the preprocessed first projection image to generate the preliminary corrected first projection image. The preprocessing of the first projection image may include at least one of a beam hardening correction or a scattering correction.

In some embodiments, the at least one processor may be further configured to cause the system to post-process the corrected first projection image. The post-processing of the corrected first projection image may include at least one of a beam hardening correction or a scattering correction.

In another aspect of the present disclosure, a method is provided. The method may be implemented on a computing device including a storage device and at least one processor. The method may include obtaining a plurality of projection images of a subject. The plurality of projection images may be generated according to scan data acquired by a CT scanner at a plurality of gantry angles. Each of the plurality of projection images may correspond to one of the plurality of gantry angles. The method may also include correcting a first projection image of the plurality of projection images according to a process for generating a corrected projection image. The first projection image may correspond to a first gantry angle of the plurality of gantry angles. The process may further include performing, based on the first projection image corresponding to the first gantry angle and a second projection image of the plurality of projection images, a first correction on the first projection image to generate a preliminary corrected first projection image. The second projection image may correspond to a second gantry angle of the plurality of gantry angles. The process may further include performing, based on at least part of the preliminary corrected first projection image, a second correction on the preliminary corrected first projection image to generate a corrected first projection image corresponding to the first gantry angle.

In yet another aspect of the present disclosure, a non-transitory computer-readable medium is provided. The non-transitory computer-readable medium may include at least one set of instructions. When executed by at least one processor of a computing device, the at least one set of instructions may cause the at least one processor to effectuate a method including obtaining a plurality of projection images of a subject. The plurality of projection images may be generated according to scan data acquired by a CT scanner at a plurality of gantry angles. Each of the plurality of projection images may correspond to one of the plurality of gantry angles. The at least one set of instructions may further cause the at least one processor to effectuate a method including correcting a first projection image of the plurality of projection images according to a process for generating a corrected projection image. The first projection image may correspond to a first gantry angle of the plurality of gantry angles. The process may include performing, based on the first projection image corresponding to the first gantry angle and a second projection image of the plurality of projection images, a first correction on the first projection image to generate a preliminary corrected first projection image. The second projection image may correspond to a second gantry angle of the plurality of gantry angles. The process may further include performing, based on at least part of the preliminary corrected first projection image, a second correction on the preliminary corrected first projection image to generate a corrected first projection image corresponding to the first gantry angle.

In yet another aspect of the present disclosure, a system is provided. The system may include an obtaining module and a correction module. The obtaining module may be configured to obtain a plurality of projection images of a subject. The plurality of projection images may be generated according to scan data acquired by a CT scanner at a plurality of gantry angles. Each of the plurality of projection images may correspond to one of the plurality of gantry angles. The correction module may be configured to correct a first projection image of the plurality of projection images according to a process for generating a corrected projection image. The first projection image may correspond to a first gantry angle of the plurality of gantry angles. The process may include performing, based on the first projection image corresponding to the first gantry angle and a second projection image of the plurality of projection images, a first correction on the first projection image to generate a preliminary corrected first projection image. The second projection image may correspond to a second gantry angle of the plurality of gantry angles. The process may also include performing, based on at least part of the preliminary corrected first projection image, a second correction on the preliminary corrected first projection image to generate a corrected first projection image corresponding to the first gantry angle.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for reconstructing a CT image according to some embodiments of the present disclosure;

DETAILED DESCRIPTION

Figure 1:
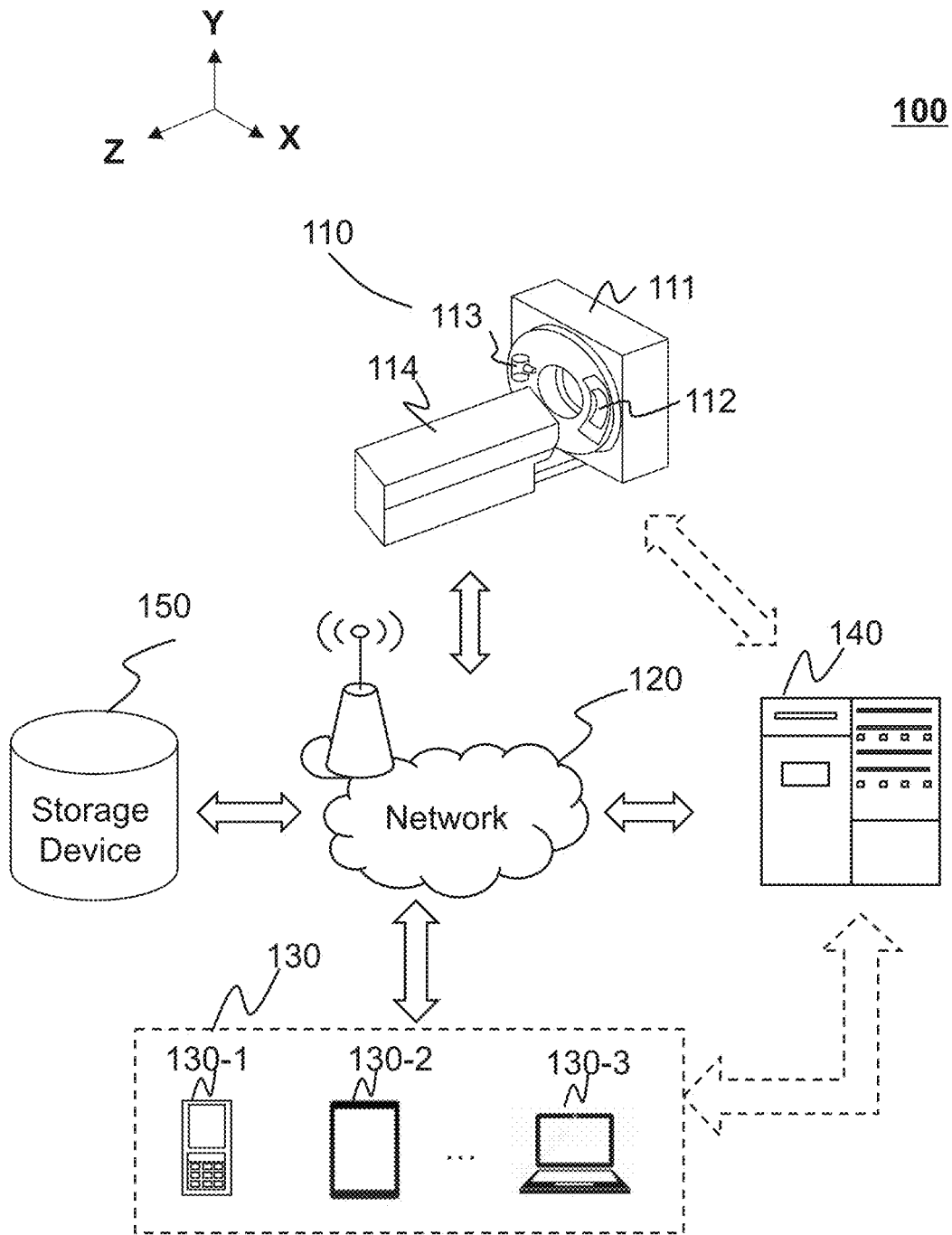
FIG. 1 is a schematic diagram illustrating an exemplary CT system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is to describe particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 illustrated in FIG. 2 and/or the central processing unit (CPU) 340 illustrated FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may apply to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for correcting a plurality of projection images of a subject. The plurality of projection images may correspond to a plurality of gantry angles of a CT scanner. To correct a projection image corresponding to a gantry angle, the systems may perform the methods to perform a first correction on the projection image to generate a preliminary corrected projection image. The first correction may be performed based on another projection image corresponding to another gantry angle. For example, the first correction may be performed based on a neighboring projection image of the projection image as described elsewhere in this disclosure. The systems may also perform the methods to perform a second correction on the preliminary corrected projection image to generate a corrected projection image. The second correction may be performed based on at least part of the preliminary corrected projection image, for example, one or more pixels corresponding to a middle-channel of the CT scanner at the gantry angle. In some embodiments, the systems and methods may correct each of the plurality of projection images corresponding to the plurality of gantry angles. The systems and methods may further reconstruct a CT image of the subject based on the plurality of corrected projection images corresponding to the gantry angles.

FIG. 1 is schematic diagrams illustrating an exemplary CT system 100 according to some embodiments of the present disclosure. In some embodiments, the CT system 100 may include a conventional CT system, a cone beam CT (CBCT) system, a helical CT system, a multi-slice CT system, a digital subtraction angiography (DSA) system, or the like, or any combination thereof.

As illustrated in FIG. 1, the CT system 100 may include a CT scanner 110, a network 120, a terminal 130, a processing device 140, and a storage device 150. The components of the CT system 100 may be connected to each other in one or more of various ways. Merely by way of example, the CT scanner 110 may be connected to the processing device 140 via the network 120. As another example, the CT scanner 110 may be connected to the processing device 140 directly. As a further example, the storage device 150 may be connected to the processing device 140 directly or via the network 120. As still a further example, the terminal 130 may be connected to the processing device 140 directly or via the network 120.

The CT scanner 110 may include a gantry 111, a detector 112, a radiation source 113, and a scanning table 114. The detector 112 and the radiation source 113 may be oppositely mounted to the gantry 111. A subject may be placed on the scanning table 114 and moved into a detection tunnel of the CT scanner 110. For illustration purposes, a reference coordinate system as shown in FIG. 1 is introduced. The reference coordinate system may include an X-axis, a Y-axis, and a Z-axis. The Z-axis may refer to a direction along which the object is moved into and/or out of the detection tunnel of the CT scanner 110. The X-axis and the Y-axis may form a plane perpendicular to the Z-axis.

The radiation source 113 may emit X-rays to scan a subject that is placed on the scanning table 114. The subject may be a biological subject (e.g., a patient, an animal) or a non-biological subject (e.g., a human-made subject). In the present disclosure, "object" and "subject" are used interchangeably. The detector 112 may detect radiation (e.g., X-rays) emitted from the radiation source 113. In some embodiments, the detector 112 may include a plurality of detector units. The detector units may include a scintillation detector (e.g., a cesium iodide detector) or a gas detector. The detector units may be arranged in a single row or multiple rows.

In some embodiments, the CT scanner 110 may include one or more components to prevent or reduce beam hardening and/or radiation scattering during a scan. For example, the CT scanner 110 may include a grid (e.g., an anti-scatter grid), and/or any other component that may prevent or reduce beam hardening. As another example, the CT scanner 110 may include an X-ray collimator, a metal grid, a slit, a beam stop array (BSA), a beam attenuation grid (BAG), and/or any other component that may prevent or reduce radiation scattering.

The network 120 may facilitate exchange of information and/or data. In some embodiments, one or more components of the CT system 100 (e.g., the CT scanner 110, the terminal 130, the processing device 140, or the storage device 150) may send information and/or data to another component(s) in the CT system 100 via the network 120. For example, the processing device 140 may obtain scanning data from the CT scanner 110 via the network 120. As another example, the processing device 140 may obtain user instructions from the terminal 130 via the network 120. In some embodiments, the network 120 may be any type of wired or wireless network, or combination thereof. The network 120 may be and/or include a public network (e.g., the Internet), a private network (e.g., a local area network (LAN), a wide area network (WAN), etc.), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points through which one or more components of the CT system 100 may be connected to the network 120 to exchange data and/or information.

The terminal 130 include a mobile device 130-1, a tablet computer 130-2, a laptop computer 130-3, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, eyeglasses, a helmet, a watch, clothing, a backpack, an accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, the terminal 130 may remotely operate the CT scanner 110. In some embodiments, the terminal 130 may operate the CT scanner 110 via a wireless connection. In some embodiments, the terminal 130 may receive information and/or instructions inputted by a user, and send the received information and/or instructions to the CT scanner 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

In some embodiments, the processing device 140 may process data obtained from the CT scanner 110, the terminal 130, or the storage device 150. For example, the processing device 140 may obtain a plurality of projection images corresponding to a plurality of gantry angles. The processing device 140 may further correct the projection images to generate a plurality of corrected projection images corresponding to the gantry angles.

The processing device 140 may be a central processing unit (CPU), a digital signal processor (DSP), a system on a chip (SoC), a microcontroller unit (MCU), or the like, or any combination thereof. In some embodiments, the processing device 140 may be a single server or a server group. The server group may be centralized or distributed. In some embodiments, the processing device 140 may be local or remote. For example, the processing device 140 may access information and/or data stored in the CT scanner 110, the terminal 130, and/or the storage device 150 via the network 120. As another example, the processing device 140 may be directly connected to the CT scanner 110, the terminal 130, and/or the storage device 150, to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the terminal 130 and/or the processing device 140. In some embodiments, the storage device 150 may store data and/or instructions that the processing device 140 may execute or use to perform exemplary methods described in the present disclosure. In some embodiments, the storage device 150 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the CT system 100 (e.g., the terminal 130, the processing device 140). One or more components of the CT system 100 may access the data or instructions stored in the storage device 150 via the network 120. In some embodiments, the storage device 150 may be directly connected to or communicate with one or more components of the CT system 100 (e.g., the terminal 130, the processing device 140). In some embodiments, the storage device 150 may be part of the processing device 140.

Figure 2:
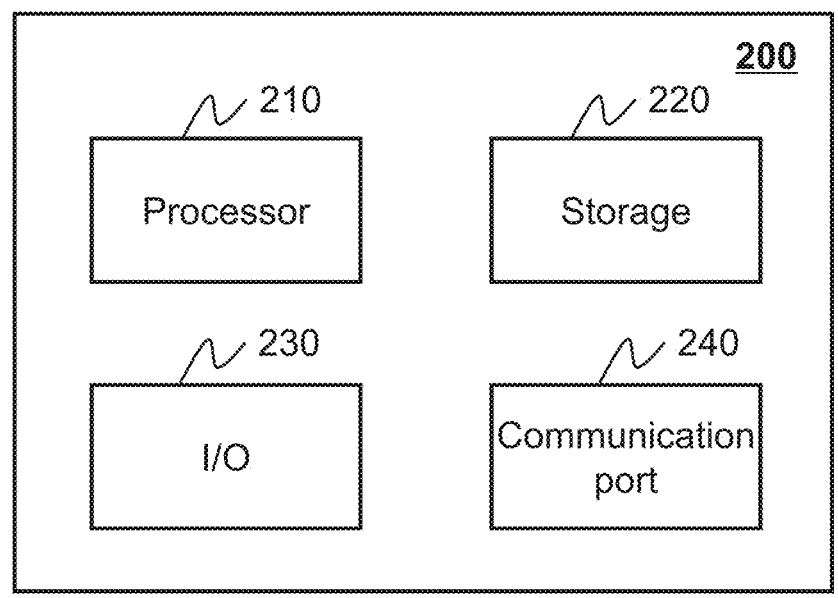
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 on which the processing device 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (program code) and, when executing the instructions, cause the processing device 140 to perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may process data and/or images obtained from the CT scanner 110, the terminal 130, the storage device 150, and/or any other component of the CT system 100. For example, the processor 210 may preprocess and/or correct a projection image. As a further example, the processor 210 may reconstruct a CT image based on a plurality of corrected projection images and store the CT image in the storage device 150. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the CT scanner 110, the terminal 130, the storage device 150, or any other component of the CT system 100. In some embodiments, the storage 220 may include a mass storage device, removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program (e.g., in the form of computer-executable instructions) for the processing device 140 for correcting a projection image corresponding to a gantry angle. As another example, the storage 220 may store a program (e.g., in the form of computer-executable instructions) for the processing device 140 for reconstructing a CT image based on a plurality of (corrected) projection images corresponding to a plurality of gantry angles.

The I/O 230 may input or output signals, data, and/or information. In some embodiments, the I/O 230 may enable a user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the CT scanner 110, the terminal 130, or the storage device 150. The connection may be a wired connection, a wireless connection, or combination of both that enables data transmission and reception. The wired connection may include an electrical cable, an optical cable, a telephone wire, or the like, or any combination thereof. The wireless connection may include Bluetooth, Wi-Fi, WiMAX, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
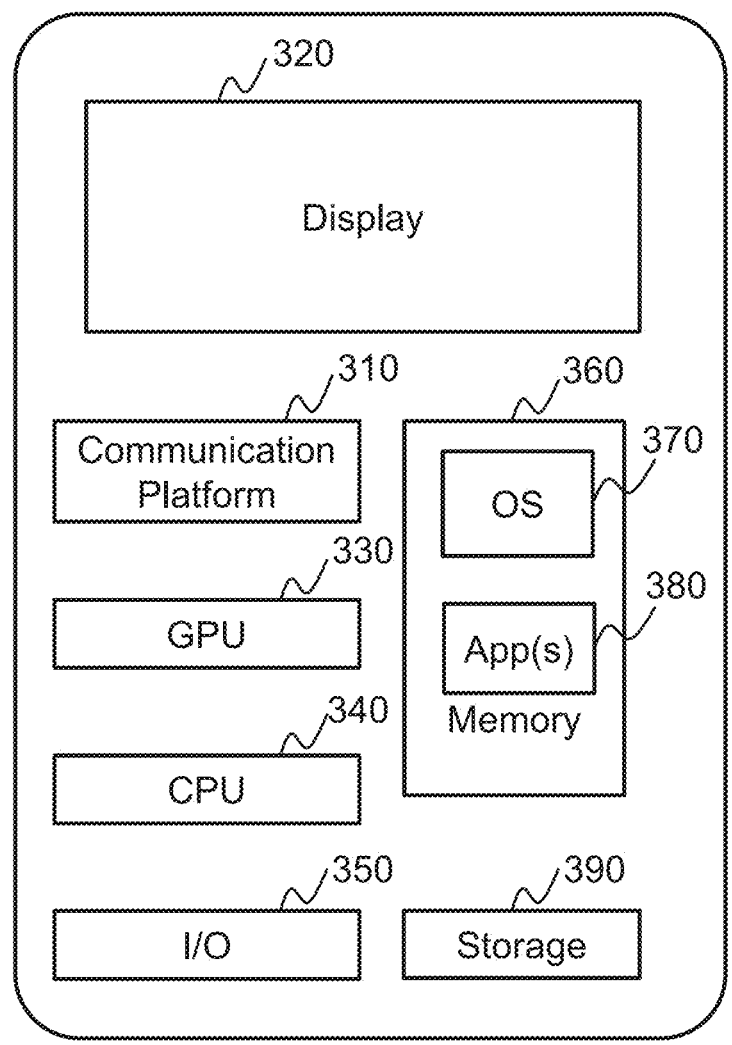
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, the GPU 330 may be configured to facilitate image correction and/or image reconstruction. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the CT system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to correct a projection image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4:
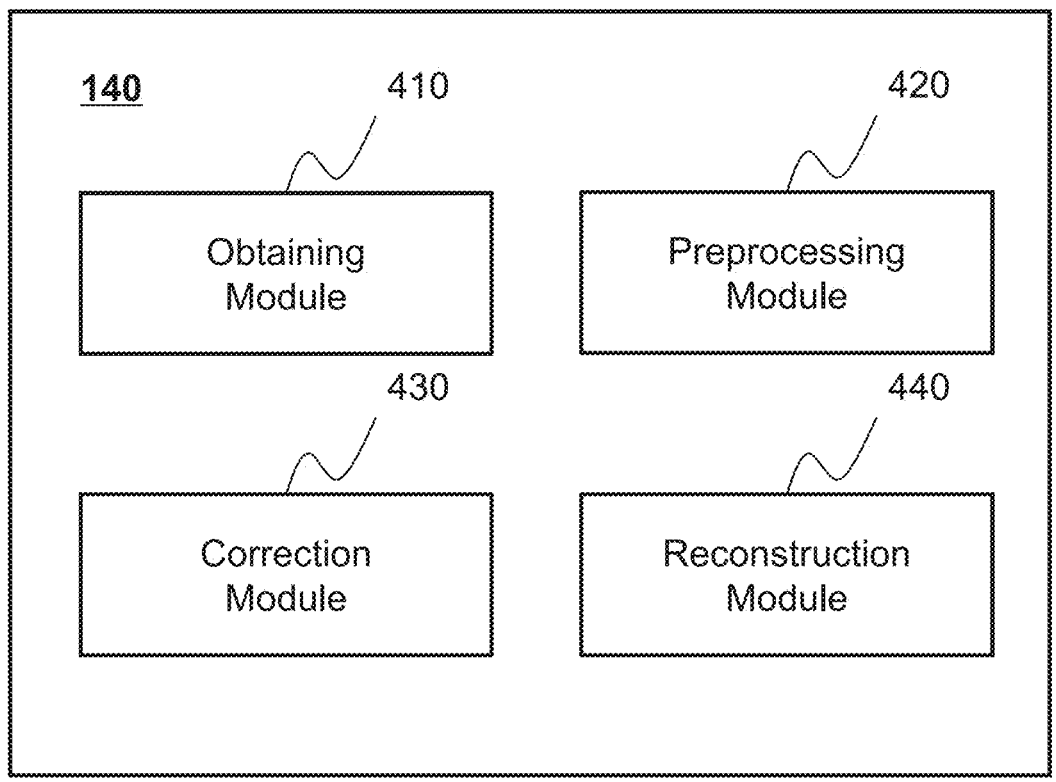
FIG. 4 is a block diagram illustrating an exemplary processing device according to some embodiments of the present disclosure.

FIG. 4 is a block diagram illustrating an exemplary processing device 140 according to some embodiments of the present disclosure. The processing device 140 may be implemented on the computing device 200 (e.g., the processor 210) as illustrated in FIG. 2 or the CPU 340 as illustrated in FIG. 3. The processing device 140 may include an obtaining module 410, a preprocessing module 420, a correction module 430, and a reconstruction module 440.

The obtaining module 410 may be configured to obtain information related to the CT system 100. The information may include scan data (e.g., one or more gantry angles, a radiation dose, a parameter related to a collimator or a scanning table, or other parameters), image data (e.g., one or more projection images), or the like. For example, the obtaining module 410 may obtain a plurality of projection images of a subject. The plurality of projection images may be generated according to scan data acquired by a CT scanner (e.g., the CT scanner 110) at a plurality of gantry angles. Each of the plurality of projection images may correspond to one of the plurality of gantry angles. In some embodiments, the gantry angle may refer to an angle formed by the line connecting the radiation source 113 and the rotation center of the gantry 111 and a reference system (e.g., the X-axis, the Y-axis as illustrated in FIG. 1). Merely by way of example, the CT scanner 110 may perform a scan of the subject by irradiating the subject with X-rays. During the scan, the radiation source 113 and the detector 112 may rotate with the gantry 111 around the Z-axis to scan the subject at different gantry angles. Sets of scan data corresponding to a plurality of gantry angles may be acquired. The processing device 140 and/or the CT scanner 110 may generate a plurality of projection images corresponding to the gantry angles according to the sets of scan data, and transmit the projection images to a storage device (e.g., the storage device 150) for storage. The obtaining module 410 may access the storage device and retrieve the projection images.

The preprocessing module 420 may be configured to preprocess a projection image. For example, the preprocessing module 420 may preprocess a projection image corresponding to a gantry angle. The preprocessing of a projection image may include a defect pixel correction, a dark field correction, a gain correction, a geometry correction, a beam hardening correction, a scattering correction, or the like, or any combination thereof. In some embodiments, the preprocessing of a projection image may include a beam hardening correction and/or a scattering correction. Details regarding the beam hardening correction and/or the scattering correction may be found elsewhere in the present disclosure (e.g., step 520 of the process 500 and the relevant descriptions thereof).

The correction module 430 may be configured to correct a projection image. For example, the correction module 430 may correct a projection image and/or a preprocessed projection image corresponding to a gantry angle as described elsewhere in this disclosure (e.g., step 530 of the process 500, the process 600, and the relevant descriptions thereof). In some embodiments, the projection image to be corrected may be a two-dimensional (2D) image. In some embodiments, the correction module 430 may correct a (preprocessed) projection image corresponding to a gantry angle by performing a first correction and a second correction on the (preprocessed) projection image. The first correction and the second correction may be configured to remove frequency dose variation in the (preprocessed) projection image. Details regarding the first correction and/or the second correction may be found elsewhere in the present disclosure (e.g., FIGS. 5 and 6, and the relevant descriptions thereof).

In some embodiments, the correction module 430 may also be configured to correct a plurality of projection images corresponding to a plurality of gantry angles to generate a plurality of corrected projection images. The correction of the projection images may include one or more iterations. For example, in each current iteration, the correction module 430 may determine whether the corrected projection images in the current iteration satisfy a condition. In response to a result of the determination that the condition is satisfied, the correction module 430 may terminate the current iteration. According to the corrected projection images in the current iteration, a CT image may be reconstructed. In response to a result of the determination that the condition is not satisfied, the correction module 430 may designate the corrected projection image in the current iteration as the projection images in the next iteration. In the next iteration, the projection images may be corrected (or preprocessed and corrected) again. The iterations may continue until the correction module 430 determines that in the new iteration, the corrected projection images satisfy the condition. Details regarding the iterations of correction may be found elsewhere in the present disclosure (e.g., FIG. 8 and the relevant descriptions thereof).

The reconstruction module 440 may be configured to reconstruct an image. For example, the reconstruction module 440 may reconstruct a CT image of a subject based on the plurality of (corrected) projection images corresponding to a plurality of gantry angles. In some embodiments, the reconstruction module 440 may reconstruct an image according to a reconstruction technique. Exemplary reconstruction techniques may include but are not limited to an algebraic reconstruction technique (ART), a simultaneous algebra reconstruction technique (SART), a filtered back projection (FBP) technique, a Feldkamp-Davis-Kress (FDK) reconstruction technique, or the like, or any combination thereof.

The modules in the processing device 140 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, two or more of the modules may be combined into a single module, and any one of the modules may be divided into two or more units. For example, the preprocessing module 420 and the correction module 430 may be integrated into a single module configured to perform the functions thereof. As another example, the correction module 430 may be divided into two units. The first unit may be configured to perform a first correction on a (preprocessed) projection image to generate a preliminary corrected projection image. The second unit may be configured to perform a second correction on the preliminary corrected projection image to generate a corrected projection image.

In some embodiments, the processing device 140 may include one or more additional modules. For example, the processing device 140 may include a post-processing module (not shown). The post-processing module may be configured to post-process a corrected projection image, for example, perform a beam hardening and/or a scattering correction, an image enhancement on the corrected projection image. As another example, the processing device 140 may include a storage module (not shown). The storage module may be configured to store data generated during any process performed by any component of the processing device 140.

FIG. 5 is a flowchart illustrating an exemplary process for reconstructing a CT image according to some embodiments of the present disclosure. The process 500 may be implemented in the CT system 100 illustrated in FIG. 1. For example, the process 500 may be stored in the storage device 150 and/or the storage 220 in the form of instructions (e.g., an application), and invoked and/or executed by the processing device 140 (e.g., the processor 210 illustrated in FIG. 2, or one or more modules in the processing device 140 illustrated in FIG. 4). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, the obtaining module 410 may obtain a plurality of projection images of a subject. The subject may be a biological subject (e.g., a patient, an animal, an organ, tissue) or a non-biological subject (e.g., a phantom).

The plurality of projection images may be generated according to scan data acquired by a CT scanner (e.g., the CT scanner 110) at a plurality of gantry angles. Each of the plurality of projection images may correspond to one of the plurality of gantry angles. For example, the CT scanner 110 may perform a scan of the subject by irradiating the subject with X-rays. During the scan, the radiation source 113 and the detector 112 may rotate with the gantry 111 around the Z-axis to scan the subject at different gantry angles. The scan data of the subject may include a plurality of sets of data corresponding to the plurality of gantry angles. The processing device 140 and/or the CT scanner 110 may generate a plurality of projection images corresponding to the plurality of gantry angles according to the sets of data, and transmit the projection images to a storage device (e.g., the storage device 150) for storage. The obtaining module 410 may access the storage device and retrieve the projection images.

In some embodiments, the gantry angle may refer to an angle formed by the line connecting the radiation source 113 and the rotation center of the gantry 111 and a reference system (e.g., the X-axis, the Y-axis as illustrated in FIG. 1). The gantry angles of the plurality of projection images acquired in 510 may range from, for example, 0° to 360°. In some embodiments, the radiation source 113 may emit X-rays toward the subject continuously when the gantry 111 rotates. For example, the gantry angles may range from 0° to 360°, and a plurality of sets of scan data corresponding to a plurality of gantry angles (e.g., 1,200 or 2,400 gantry angles) may be collected by the detector 112. Accordingly, 1,200 projection images corresponding to 1,200 gantry angles or 2,400 projection images corresponding to 2,400 gantry angles may be generated. Alternatively, the radiation source 113 may emit X-rays toward the subject discontinuously. For example, the gantry angles may range from 0° to 360°, and the radiation source 113 may emit X-rays toward the subject in every 1° change in gantry angle. Accordingly, 360 projection images may be generated. As another example, the gantry angles may range from 0° to 360°, and the radiation source 113 may emit X-rays toward the subject in every 0.5° change in gantry angle. Accordingly, 720 projection images may be generated.

In some embodiments, a gantry angle of a projection image may be obtained from one or more components of the CT system 100, such as an encoder of gantry angles. Additionally or alternatively, a gantry angle of a projection image may be determined by, for example, the processing device 140 based on data analysis of the gantry angles of other projection images. Merely by way of example, the processing device 140 may determine a gantry angle of a projection image based on a plurality of other projection images corresponding to other gantry angles using an interpolation algorithm.

In some embodiments, the plurality of projection images may include a plurality of 2D images. In some embodiments, a projection image may include a plurality of pixels. A pixel may have a pixel value, such as a grey-scale value, a luminance value, or the like, or any combination thereof. The pixel value (e.g., the grey-scale value) of a pixel corresponding to a spatial point of the subject may have a linear relationship with the radiations (also referred to herein as the dose of radiations) delivered to the spatial point of the subject. When the gantry 111 rotates, the radiation dose emitted by the radiation source 113 may fluctuate, which may result in a difference between actual gray values and ideal gray values of the pixels in the projection images at the plurality of gantry angles. During CT image reconstruction, the logarithm of the gray values of the pixels in the projection images may have a positive relationship with the attenuation coefficients of the subject. The difference between the actual pixel values and the ideal pixel values of the projection images may affect the quality of the CT image reconstructed based on the projection images. The plurality of projection images corresponding to different gantry angles may need to be corrected and/or normalized to reduce the effect of uneven radiation doses at different gantry angles.

In 520, the preprocessing module 420 may preprocess the plurality of projection images to generate a plurality of preprocessed projection images corresponding to the plurality of gantry angles. The preprocessing of the plurality of projection images may include a defect pixel correction, a dark field correction, a gain correction, a geometry correction, a beam hardening correction, a scatter correction, or the like, or any combination thereof.

In some embodiments, the preprocessing of the plurality of projection images may include a beam hardening correction and/or a scatter correction. The beam hardening correction may be performed based on a beam hardening correction algorithm. Exemplary beam hardening correction algorithms may include a polynomial fitting algorithm, a Monte Carlo simulation algorithm, an iterative correction algorithm, a dual energy correction algorithm, a single energy correction algorithm, or the like, or any combination thereof. The scatter correction may be performed based on a scatter correction algorithm. Exemplary scatter correction algorithms may include a convolution algorithm, a model assessing algorithm, a deconvolution algorithm, a Monte Carlo simulation algorithm, a single scatter simulation technique, a dual energy-window technique, a beam-stop technique, a frequency modulation technique, or the like, or any combination thereof.

In some embodiments, the preprocessing module 420 may preprocess a projection image corresponding to a gantry angle based on a radiation dose delivered to the subject at the gantry angle. The radiation dose delivered to the subject at the gantry angle may be a planned dose or a dose measured by an ionization chamber when the CT scanner 110 scans the subject at the gantry angle. For example, the preprocessing module 420 may determine an intensity of X-rays passing through the subject based on the radiation dose delivered to the subject at the gantry angle. The preprocessing module 420 may further perform a scattering correction on the projection image based on the intensity of X-rays.

In 530, the correction module 430 may correct the plurality of preprocessed projection images corresponding to the plurality of gantry angles to generate a plurality of corrected projection images. The corrected projection images may be 2D images.

In some embodiments, the correction module 430 may correct a first preprocessed projection image corresponding to a first gantry angle by performing a first correction and/or a second correction on the first preprocessed projection image. The first gantry angle may be any one of the gantry angles. The first correction and the second correction may be configured to remove dose variation in the first preprocessed projection image. The first correction may be performed on the first preprocessed projection image to generate a preliminary corrected first projection image. The first correction may be performed based on a preprocessed projection image corresponding to a second gantry angle. The second gantry angle may be any one of the gantry angles other than the first gantry angle. In some embodiments, the second gantry angle may be a neighboring gantry angle of the first gantry angle. A gantry angle may be considered as a neighboring gantry angle of the first gantry angle if the angular difference between the gantry angle and the first gantry angle is less than an angle threshold (e.g., 2°). For brevity, a projection image corresponding to a neighboring gantry angle of the first gantry angle may be referred to as a neighboring projection image of the first projection image. Details regarding the first correction may be found elsewhere in the present disclosure (e.g., FIG. 6 and the relevant descriptions thereof).

The second correction may be performed on the preliminary corrected first projection image to generate a corrected projection image corresponding to the first gantry angle. In some embodiments, the second correction may be performed based on at least part of the preliminary corrected first projection image. For example, the second correction may be performed based on one or more pixels corresponding to a middle-channel of the CT scanner 110 at the first gantry angle. Details regarding the second correction may be found elsewhere in the present disclosure (e.g., FIGS. 6 and 7, and the relevant descriptions thereof).

In some embodiments, for each of preprocessed projection images, the correction module 430 may perform a first correction and/or a second correction on the preprocessed projection image to generate a corrected projection image. In some embodiments, the first correction for each preprocessed projection image may be performed based on a preprocessed neighboring projection image. Alternatively, the correction module 430 may rank the preprocessed projection images according to their gantry angles and perform the first correction on the plurality of preprocessed projection images in sequence. The first correction of a preprocessed projection image corresponding to a gantry angle may be performed based on a preliminary corrected neighboring projection image. Merely by way of example, the correction module 430 may perform the first correction on a first preprocessed projection image corresponding to 0°, a second preprocessed projection image corresponding to 1°, . . . , and a 360th preprocessed projection image corresponding to 359° in sequence. The correction module 430 may perform the first correction on the first preprocessed projection image based on the 360th preprocessed projection image to generate a preliminary corrected first projection image, perform a first correction on the second preprocessed projection image based on the preliminary corrected first projection image, . . . , and perform a first correction on the 360th preprocessed projection image based on the preliminary corrected 359th projection image.

In 540, the reconstruction module 440 may reconstruct a CT image of the subject based on the plurality of corrected projection images. In some embodiments, the reconstruction module 440 may reconstruct the CT image according to a reconstruction technique. Exemplary reconstruction techniques may include but are not limited to an algebraic reconstruction technique (ART), a simultaneous algebra reconstruction technique (SART), a filtered back projection (FBP) technique, a Feldkamp-Davis-Kress (FDK) reconstruction technique, or the like, or any combination thereof. In some embodiments, the CT image may be a 3-dimensional (3D) CT image. The CT image may include a plurality of pixels. The pixel values of the plurality of pixels may indicate attenuation coefficients of different portions of the subject.

It should be noted that the above description of the process 500 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

In some embodiments, step 520 may be omitted. In 530, the correction module 430 may correct the plurality of projection images corresponding to the plurality of gantry angles to generate a plurality of corrected projection images. In some embodiments, the order of the steps of the process 500 may be changed. For example, at least part of the preprocessing of the projection images as described in connection with step 520 may be performed after step 530. In some embodiments, step 520 may be performed without a beam hardening correction and/or scattering correction. The processing device 140 (e.g., a post-processing module not shown in figures) may perform the beam hardening and/or scattering correction on the corrected projection images after step 530 to post-process the corrected projection images. In 540, the reconstruction module 440 may reconstruct the CT image of the subject based on the post-processed projection images.

Figure 6:
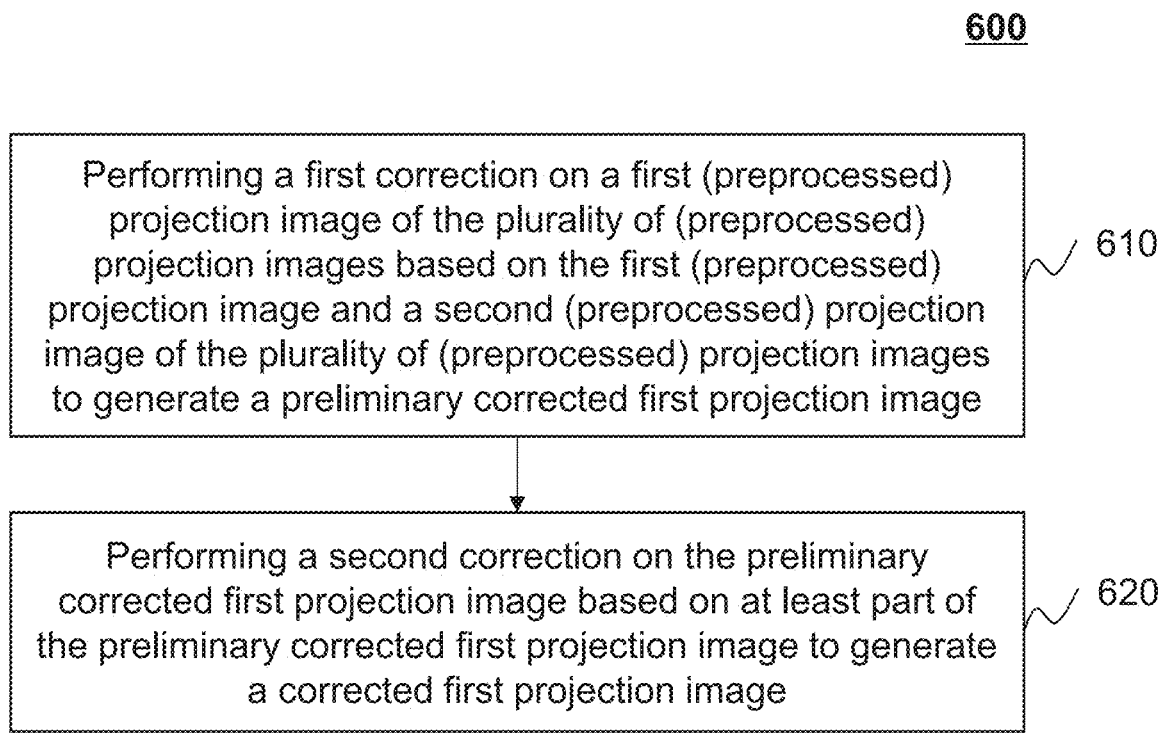
FIG. 6 is a flowchart illustrating an exemplary process for correcting a projection image according to some embodiments of the present disclosure.

FIG. 6 is a flowchart illustrating an exemplary process for correcting a projection image according to some embodiments of the present disclosure. The process 600 may be implemented in the CT system 100 illustrated in FIG. 1. For example, the process 600 may be stored in the storage device 150 and/or the storage 220 in the form of instructions (e.g., an application), and invoked and/or executed by the processing device 140 (e.g., the processor 210 illustrated in FIG. 2, or one or more modules in the processing device 140 illustrated in FIG. 4). The operations of the illustrated process presented below are intended to be illustrative. In some embodiments, the process 600 may be accomplished with one or more additional operations not described, and/or without one or more of the operations discussed. Additionally, the order in which the operations of the process 600 as illustrated in FIG. 6 and described below is not intended to be limiting.

In some embodiments, the process 600 may be performed to correct a first preprocessed projection image of the plurality of preprocessed projection images obtained in step 520. In 530, the correction module 430 may repeat the process 600 for each of the plurality of preprocessed projection images. Alternatively, the process 600 may be performed to correct a first projection image of the plurality of projection images obtained in 510. In some embodiments, step 520 may be omitted. In 530, the correction module 430 may correct the plurality of projection images by repeating the process 600 for each of the plurality of projection images. For illustration purposes, the correction of a first projection image of the plurality of projection images is described as an example in the present disclosure.

In 610, the correction module 430 may perform the first correction on a first projection image of the plurality of projection images, based on the first projection image and a second projection image of the plurality of projection images, to generate a preliminary corrected first projection image. The first projection image may correspond to a first gantry angle of the plurality of gantry angles. The first gantry angle may be any one of the gantry angles. The second projection image may correspond to a second gantry angle of the gantry angles. The second gantry angle may be any one of the gantry angles other than the first gantry angle. In some embodiments, the second gantry angle may be a neighboring gantry angle of the first gantry angle. A gantry angle may be considered as a neighboring gantry angle of the first gantry angle if the angular difference between the gantry angle and the first gantry angle is less than an angle threshold. Merely by way of example, the gantry angles may be integers ranging from 0° to 360°, and the angle threshold may be 2°. The neighboring gantry angle of 10° may be 9° or 11°.

In some embodiments, the correction module 430 may determine a first correction coefficient of the first projection image based on the difference between the first projection image and the second projection image, and correct the first projection image based on the first correction coefficient. In some embodiments, the first correction coefficient may be a multiplicative factor applied to a projection image to correct the projection image for the intensity fluctuation of the radiation source 113 at the creation of the projection image. In some embodiments, the first correction coefficient may be a scalar applied to the entire projection image. In some embodiments, the first correction coefficient may be a vector or a matrix which applies possibly unique factors to different pixels in the projection image. In some embodiments, the difference between the first projection image and the second projection image may be the difference between the grey information of the first projection image and the grey information of the second projection image. The grey information of the first projection image or the second projection image may be represented by, such as an image matrix, an image histogram, or the like. In some embodiments, the grey information of a projection image may be determined by the intensity of the radiation source 113 during the creation of the projection image and the attenuation properties of the imaged subject during the creation of the projection image. For example, the logarithm of a grey value of a pixel may be approximate to an attenuation coefficient of the physical point corresponding to the pixel.

The first correction coefficient may be a coefficient that minimizes the difference between the first projection image and the second projection image. In some embodiments, a correction coefficient that minimizes the difference between two images corresponding to two gantry angles may be determined according to Equation (1) as below:

$$a_{ij} = \underset{a_{ij} \in R}{\operatorname{argmin}} \| f(I_i) - a_{ij} f(I_j) \|, \quad (1)$$

wherein i and j represent two gantry angles of the plurality of gantry angles, respectively; R represents a set of real matrixes; $I_i$ represents a projection image corresponding to the gantry angle i; $I_j$ represents a projection image corresponding to the gantry angle j; $f(I_i)$ represents the grey information of $I_i$; $f(I_j)$ represents the grey information of $I_j$; and $a_{ij}$ represents a correction coefficient that minimizes the difference between $I_i$ and $I_j$. In some embodiments, $f(I_i)$ may be an image matrix, an image histogram of $I_i$, or the like, and $f(I_j)$ may be an image matrix, an image histogram of $I_j$, or the like. The norm in Equation (1) may be the $L_2$-norm, the $L_1$-norm, or some other metric, that when being optimized, increases the similarity between $f(I_i)$ and $a_{ij}f(I_j)$.

In some embodiments, $f(I_i)$ may represent attenuation information related to the projection image $I_i$. The attenuation information related to the projection image $I_i$ may be determined based on the grey information of the projection image $I_i$. For example, the attenuation information may include a plurality of attenuation coefficients of physical points that correspond to the pixels in the projection image $I_i$. An attenuation coefficient of a physical point corresponding to a pixel in the projection image $I_i$ may be the logarithm of the grey value of that pixel. Similarly, $f(I_j)$ may represent attenuation information related to the projection image $I_j$.

In some embodiments, the first correction coefficient of the first projection image may be determined according to Equation (1). $I_i$ may represent the first projection image, $I_j$ may represent the second projection image, and $a_{ij}$ may represent the first correction coefficient. Alternatively, $I_j$ may represent the first projection image, $I_i$ may represent the second projection image, and the $a_{ij}$ may represent the first correction coefficient. After the first correction coefficient is determined, the correction module 430 may generate the preliminary corrected first projection image based on the first correction coefficient and the first projection image. In some embodiments, the preliminary corrected first projection image may be determined by multiplying the grey information of the first projection image by the first correction coefficient, or dividing the grey information of the first projection image by the first correction coefficient. For example, when $I_i$ represents the first image and $I_j$ represents the second image, the correction module 430 may generate the preliminary corrected first projection image by dividing the grey information of the first projection image by $a_{ij}$. For example, the grey values of the pixels in the first projection image may be divided by $a_{ij}$. When $I_j$ represents the first image and $I_i$ represents the second image, the correction module 430 may generate the preliminary corrected first projection image by multiplying the grey information of the first projection image by $a_{ij}$. For example, the grey values of the pixels in the first projection image may be multiplied by $a_{ij}$.

In some embodiments, the first correction coefficient of the first projection image may be determined based on the attenuation information of the first and second projection images. The correction module 430 may correct the attenuation information of the first projection image by multiplying the attenuation information of the first projection image by the first correction coefficient, or dividing the attenuation information of the first projection image by the first correction coefficient. The correction module 430 may generate a preliminary corrected first projection image by performing an exponent arithmetic on the corrected attenuation information of the first projection image. The correction process of the first projection image based on the attenuation information of the first and second projection images may be regarded as a preprocessing of the first projection image in the CT image reconstruction.

In 620, the correction module 430 may perform a second correction on the preliminary corrected first projection image based on at least part of the preliminary corrected first projection image to generate a corrected first projection image. In some embodiments, the at least part of the preliminary corrected first projection image may include one or more pixels in the preliminary corrected first projection image corresponding to a middle-channel of the CT scanner 110 at the first gantry angle. A second correction coefficient may be determined based on the at least part of the preliminary corrected first projection image to correct the preliminary corrected first projection image. In some embodiments, the second correction for the preliminary corrected first projection image may be performed according to process 700 illustrated in FIG. 7 and described in detail below.

It should be noted that the above description of the process 600 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure. For example, step 620 may be omitted. In some embodiments, when the number of projection images acquired in step 510 is greater than a threshold, step 620 may be omitted. As another example, step 610 may be omitted. In 620, the correction module 430 may perform a second correction on a first projection image or a preprocessed first projection image corresponding to a first gantry angle to generate a corrected first projection image.

Figure 7:
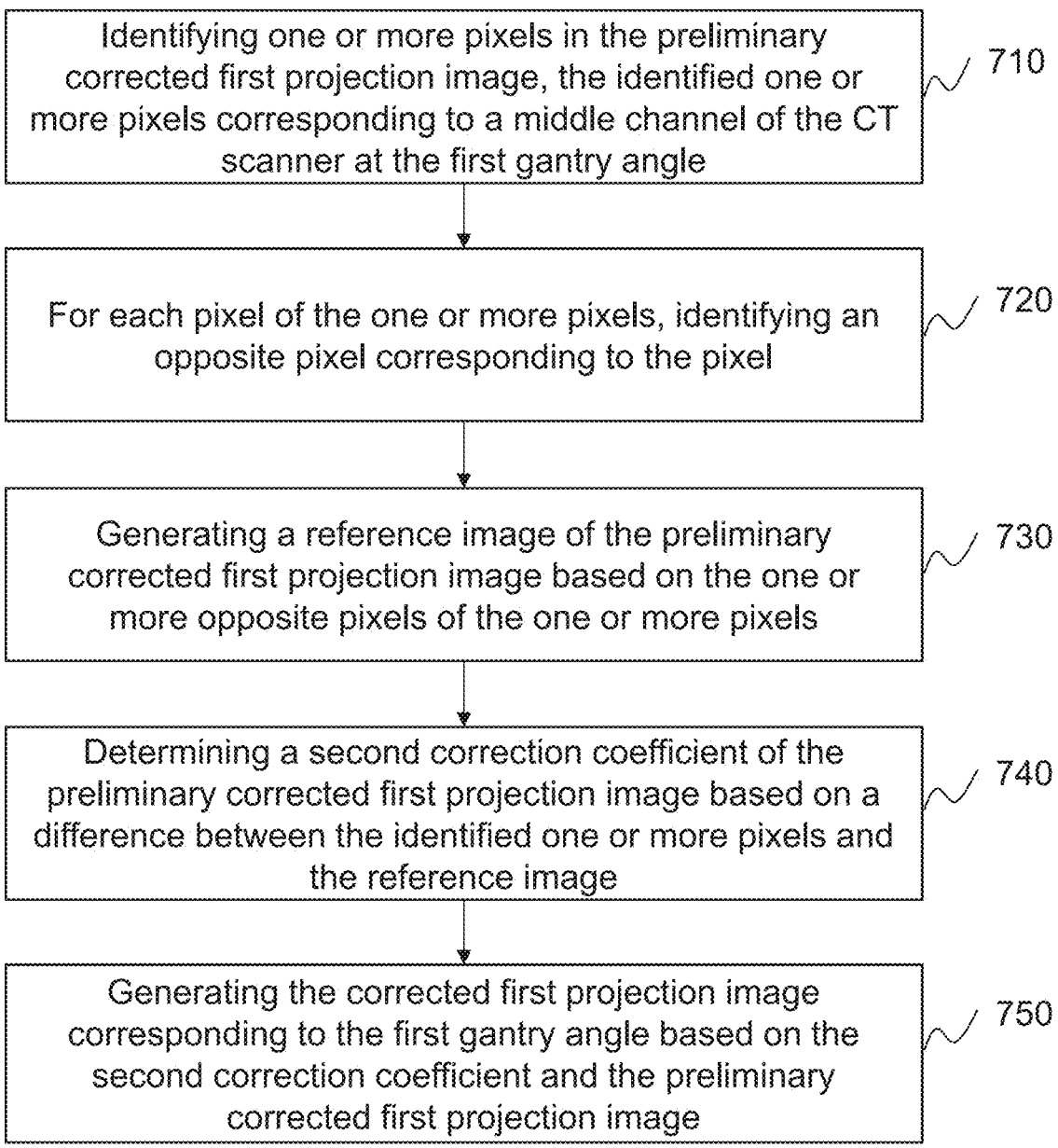
FIG. 7 is a flowchart illustrating an exemplary process for performing a correction on a preliminary corrected first projection image according to some embodiments of the present disclosure.

FIG. 7 is a flowchart illustrating an exemplary process for performing a second correction on a preliminary corrected first projection image corresponding to a first gantry angle according to some embodiments of the present disclosure. The process 700 may be implemented in the CT system 100 illustrated in FIG. 1. For example, the process 700 may be stored in the storage device 150 and/or the storage 220 in the form of instructions (e.g., an application), and invoked and/or executed by the processing device 140 (e.g., the processor 210 illustrated in FIG. 2, or one or more modules in the processing device 140 illustrated in FIG. 4). The operations of the illustrated process presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting. In some embodiments, step 620 illustrated in FIG. 6 may be performed according to the process 700.

In 710, the correction module 430 may identify one or more pixels in the preliminary corrected first projection image. The one or more identified pixels may correspond to a middle-channel of the CT scanner 110 at the first gantry angle.

The detector 112 may include a plurality of detector channels. Each of the plurality of detector channels may correspond to a row of pixels in the preliminary corrected first projection image. When the CT scanner 110 scans a subject at the first gantry angle, an X-ray may pass through the rotation center of the gantry 111 and be detected by a detector channel. The detector channel that detects the X-ray passing through the rotation center of the gantry 111 may be referred to as the middle-channel of the CT scanner 110 at the first gantry angle. In the case of a fan or a cone beam source, the X-ray that passes through the rotation center of the gantry 111 may experience substantially equal attenuation by the imaged medium at any pair of angular source positions where the pair of source angular positions is separated by 180 degrees. The expected total attenuation for an X-ray traversing a path in a substantially opposite direction to the X-ray that passes through the rotation center may be the same or substantially same as that of the X-ray that passes through the rotation center of the gantry 111.

In some embodiments, the one or more identified pixels corresponding to the middle-channel may include a row of pixels corresponding to the middle-channel. Alternatively, the one or more identified pixels may include one or more rows of pixels corresponding to one or more neighboring detector channels of the middle-channel. A detector channel may be considered as a neighboring detector channel of the middle-channel if the distance between the detector channel and the middle-channel is within a predetermined range (e.g., a detector channel, two detector-channels). In some embodiments, the identified pixels may include one or more rows of pixels corresponding to the middle-channel and one or more neighboring detector channels of the middle-channel. In some embodiments, the correction module 430 may determine a middle-channel of the CT scanner 110 at the first gantry angle, and then determine the one or more pixels in the preliminary corrected first projection image based on the middle-channel.

In 720, for each pixel of the one or more pixels, the correction module 430 may identify an opposite pixel corresponding to the pixel. A pixel of the one or more pixels may correspond to a detector unit of the middle-channel of the CT scanner 110 at the first gantry angle. The detector unit may detect an X-ray or an X-ray beam (collectively referred to herein as X-ray) emitted by the radiation source 113 at the first gantry angle. The opposite pixel may correspond to an opposite X-ray of the X-ray. The opposite X-ray may be emitted by the radiation source 113 at an opposite gantry angle of the first gantry angle corresponding to the X-ray. In some embodiments, if an X-ray passes through the rotation center of the CT scanner 110 at the first gantry angle, its corresponding opposite X-ray may be emitted by the radiation source 113 at a corresponding opposite gantry angle, which is 180 degrees from the first gantry angle. On the other hand, for an X-ray doesn't pass through the rotation center of the CT scanner 110 at the first gantry angle, the corresponding opposite gantry angle may be determined based on the first gantry angle as described elsewhere in this application (e.g., FIG. 9 and the descriptions thereof).

Figure 9:
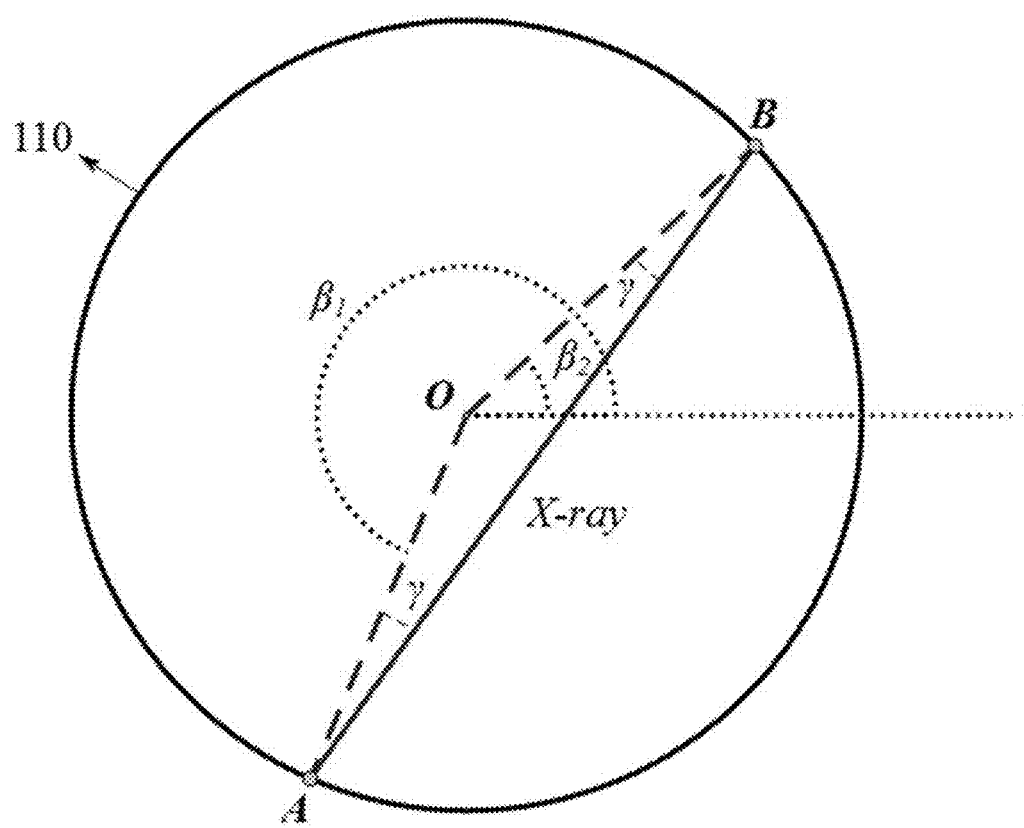
FIG. 9 illustrates a relationship between two exemplary gantry angles according to some embodiments of the present disclosure.

In some embodiments, the gantry angle may range from 0° to 360°. An X-ray emitted by the radiation source 113 at a gantry angle may be collinear with another X-ray emitted by the radiation source 113 at another gantry angle. Merely by way of example, as shown in FIG. 9, the X-ray emitted by the radiation source 113 at position A toward position B (referred to as X-ray AB) is collinear with the X-ray emitted by the radiation source 113 at position B toward position A (referred to as X-ray BA). X-ray BA may refer to as an opposite X-ray of X-ray AB. The gantry angle of the CT scanner 110 may be when the radiation source 113 is at position A. The gantry angle of the CT scanner 110 may be $\beta_2$ when the radiation source 113 is at position B. The gantry angle $\beta_2$ may be referred to as an opposite gantry angle of the gantry angle corresponding to X-ray AB. X-ray AB may correspond to a pixel in a preliminary corrected projection image corresponding to the gantry angle $\beta_1$, and X-ray BA may correspond to a pixel in a preliminary corrected projection image corresponding to the gantry angle $\beta_2$. The pixel corresponding to X-ray BA may be referred to as an opposite pixel of the pixel corresponding to X-ray AB. In some embodiments, an opposite gantry angle (e.g., the gantry angle $\beta_2$) of a gantry angle (e.g., the gantry angle $\beta_1$) corresponding to an X-ray may be determined based on the gantry angle. Details regarding the determination of an opposite gantry angle of a gantry angle may be found elsewhere in the present disclosure (e.g., FIG. 9 and the relevant descriptions thereof).

For each of the identified one or more pixels in the preliminary corrected first projection image, the correction module 430 may determine an opposite X-ray and an opposite gantry angle corresponding the pixel, and identify an opposite pixel of the pixel based on the opposite gantry angle and the opposite X-ray.

In 730, the correction module 430 may generate a reference image of the preliminary corrected first projection image based on the one or more opposite pixels of the one or more pixels.

In 740, the correction module 430 may determine a second correction coefficient of the preliminary corrected first projection image based on the difference between the identified one or more pixels corresponding to the middle-channel and the reference image. The difference between the identified one or more pixels and the reference image may be similar to that between the first projection image and the second projection image described in connection with step 610, and the descriptions thereof are not repeated here. In some embodiments, the second correction coefficient may be determined based on the difference identified one or more pixels and a portion of the reference image.

The second correction coefficient may be a coefficient that minimizes the difference between the identified one or more pixels and the reference image. In some embodiments, the second correction coefficient may be determined according to Equation (2) as below:

$$b_i = \underset{b_i \in R}{\mathrm{argmin}} \, \|f(C_{0i}) - b_i f(C_{1i})\|, \tag{2}$$

wherein i represents the first gantry angle; $C_{0i}$ represents the identified one or more pixels corresponding to the middle-channel of the CT scanner 110 at the first gantry angle i; $C_{1i}$ represents the reference image of $C_{0i}$; $f(C_{0i})$ represents the grey information of $C_{0i}$; $f(C_{1i})$ represents the grey information of $C_{1i}$; and $b_i$ represents the second correction coefficient that minimizes the difference between $C_{0i}$ and $C_{1i}$. In some embodiments, $f(C_{0i})$ may be an image matrix, an image histogram of $C_{0i}$, or the like, and $f(C_{1i})$ may be an image matrix, an image histogram of $C_{1i}$, or the like. In some embodiments, $f(C_{0i})$ may represent attenuation information related to the identified pixel(s). The attenuation information related to the identified pixel(s) may be determined based on the grey value of the identified pixel(s). For example, the attenuation information may include a plurality of attenuation coefficients of physical points that correspond to the pixels. The attenuation coefficient of a physical point corresponding to a pixel may be the logarithm of the grey value of that pixel. Similarly, $f(C_{1i})$ may represent attenuation information related to the reference image $C_{0i}$.

In 750, the correction module 430 may generate the corrected first projection image corresponding to the first gantry angle based on the second correction coefficient and the preliminary corrected first projection image. In some embodiments, the corrected first projection image may be determined by dividing the grey information of the preliminary corrected first projection image by the second correction coefficient. In some embodiments, the second correction coefficient may be determined based on the attenuation information of the identified pixel(s) and the reference image. The correction module 430 may correct the attenuation information of the preliminary corrected first projection image by multiplying the attenuation information of the preliminary corrected first projection image by the second correction coefficient, or dividing the attenuation information of the of the preliminary corrected first projection image by the second correction coefficient. The correction module 430 may generate a corrected first projection image by performing an exponent arithmetic on the corrected attenuation information of the preliminary corrected first projection image.

Figure 8:
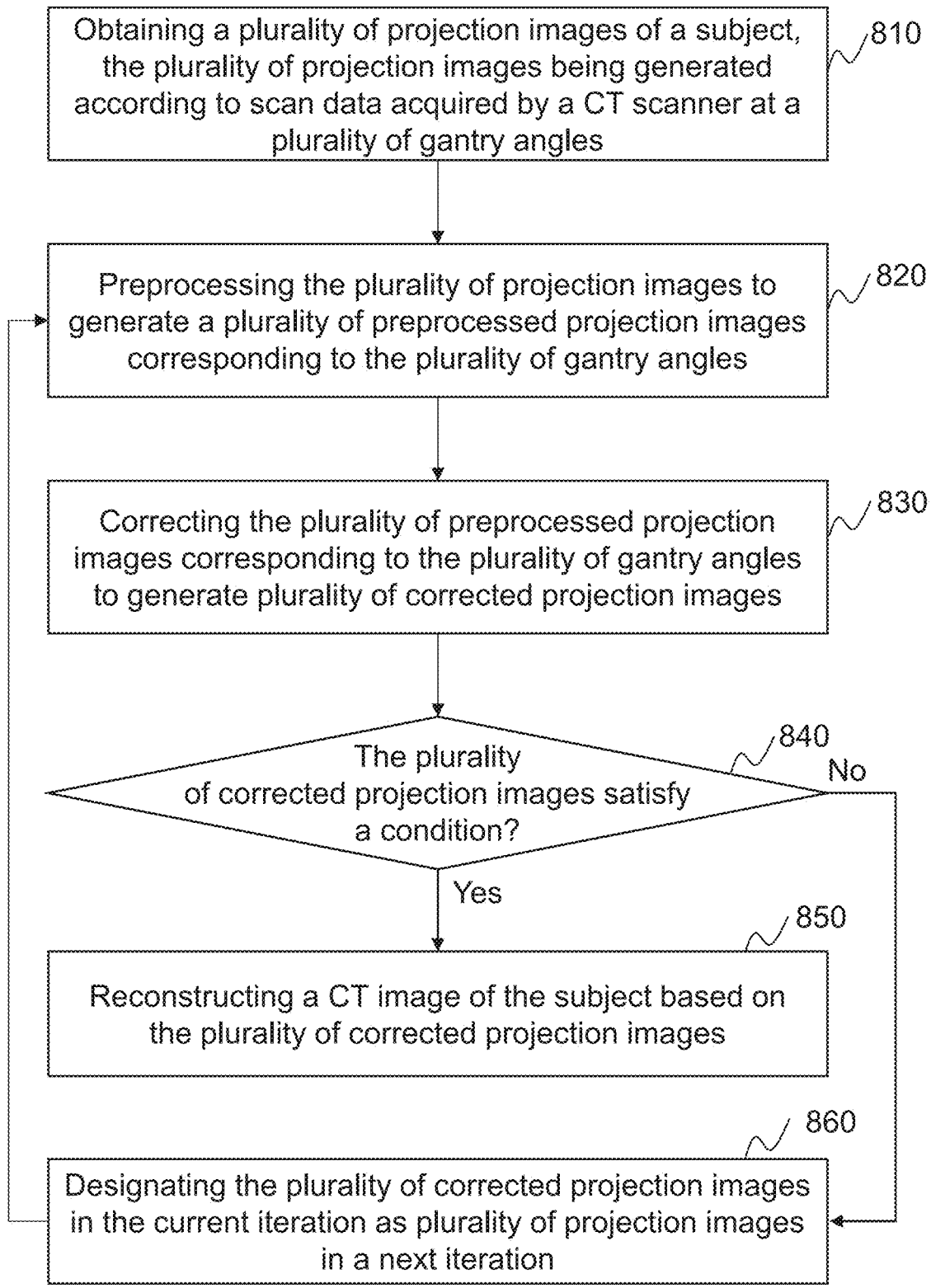
FIG. 8 is a flowchart illustrating an exemplary process for reconstructing a CT image according to some embodiments of the present disclosure.

FIG. 8 is a flowchart illustrating an exemplary process for reconstructing a CT image according to some embodiments of the present disclosure. The process 800 may be implemented in the CT system 100 illustrated in FIG. 1. For example, the process 800 may be stored in the storage device 150 and/or the storage 220 in the form of instructions (e.g., an application), and invoked and/or executed by the processing device 140 (e.g., the processor 210 illustrated in FIG. 2, or one or more modules in the processing device 140 illustrated in FIG. 4). The operations of the illustrated process presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting. In some embodiments, the process 800 may be an embodiment of the process 500 including one or more iterations.

In 810, the obtaining module 410 may obtain a plurality of projection images of a subject. The plurality of projection images may be generated according to scan data acquired by a CT scanner (e.g., the CT scanner 110) at a plurality of gantry angles. Each of the plurality of projection images may correspond to one of the plurality of gantry angles. In 820, the preprocessing module 420 may preprocess the plurality of projection images to generate a plurality of preprocessed projection images corresponding to the plurality of gantry angles. In 830, the correction module 430 may correct the plurality of preprocessed projection images to generate a plurality of corrected projection images. Steps 810 to 830 may be performed in a similar manner with steps 510 to 530, and the descriptions thereof are not repeated here.

In 840, the correction module 430 may determine whether the plurality of corrected projection images satisfy a condition. In some embodiments, the condition may be related to the number of iterations from steps 820 to 840 performed on the plurality of projection images obtained in 810. For example, the number of iterations may be counted by the correction module 430, and the condition may be that the number of iterations is larger than a first threshold. The correction module 430 may determine whether the number of iterations is larger than the first threshold. In response to a result of the determination that the number of iterations is larger than the first threshold, the correction module 430 may determine that the condition is satisfied. In response to a result of the determination that the number of iterations is equal to or smaller than the first threshold, the correction module 430 may determine that the condition is not satisfied. In some embodiments, the first threshold may be in a range of 2 to 10. In some embodiments, the first threshold may be restricted in a subrange of 1-2, 2-4, 1-5, or 5-10.

Additionally or alternatively, the condition may be related to an inconsistency between the corrected projection images (or a portion thereof). In some embodiments, the inconsistency between the corrected projection images may refer to an inconsistency between pixel values (e.g., grey-scale values) of the corrected projection images. The pixel value of a corrected projection image may be represented by the mean or median pixel value of the corrected projection image, the largest or smallest pixel value of the corrected projection image, or the like, or any combination thereof. For illustration purposes only, the following descriptions use the mean pixel values of the corrected projection images as an example. The inconsistency between the corrected projection images may be accessed by, for example, a variance of the mean pixel values, a standard deviation of the mean pixel values, or the like, or any combination thereof. The condition may be that the inconsistency between the corrected projection images (or a portion thereof) is less than a second threshold. The correction module 430 may determine whether the inconsistency between the corrected projection images (or a portion thereof) is less than the second threshold. In response to a result of the determination that the inconsistency between the corrected projection images (or a portion thereof) is less than the second threshold, the correction module 430 may determine that the condition is satisfied. In response to a result of the determination that the inconsistency between the corrected projection images (or a portion thereof) is greater than or equal to the second threshold, the correction module 430 may determine that the condition is not satisfied.

In some embodiments, the condition may be that the difference between the corrected CT images in the current iteration and the corrected CT images in the previous iteration is less than a third threshold. For example, for a corrected CT image in the current iteration, the correction module 430 may determine a difference between grey information (e.g., an average grey value) of the corrected CT image and the corresponding corrected CT image in the previous iteration. The correction module 430 may then determine whether the difference between the grey information is greater than a third threshold (e.g., 5% of the grey information of the corrected CT image in the current iteration). In response to a result of the determination that the difference between the grey information is not greater than the third threshold, the correction module 430 may determine that the condition is satisfied. In response to a result of the determination that the difference between the grey information is greater than the third threshold, the correction module 430 may determine that the condition is not satisfied. In some embodiments, the first threshold, the second threshold, and/or the third threshold may be default settings stored in a storage device (e.g., the storage device 150), or be set or adjusted by a user (e.g., a doctor).

In response to the determination that the corrected projection images satisfy the condition, the process may proceed to 850. In 850, the reconstruction module 440 may reconstruct a CT image of the subject based on the plurality of corrected projection images. The reconstruction technique is described in connection with FIG. 5, and is not repeated here.

Referring back to 840, on the other hand, in response to the determination that the corrected projection images fail to satisfy the condition, the process may proceed to 860. In 860, the correction module 430 may designate the plurality of corrected projection images in the current iteration as the plurality of projection images in the next iteration. In the next iteration, the processing device 140 may execute the process 800 to return to 820. The processing device 140 may preprocess and correct the projection images in the next iteration to generate a plurality of corrected projection images. Further, if the correction module 430 determines that the corrected projection images in the next iteration satisfy the condition, the reconstruction module 440 may reconstruct a CT image of the subject based on the corrected projection images in the next iteration. If the correction module 430 determines that the corrected projection images do not satisfy the condition, the process 800 may proceed to 860. The iterations from steps 820 to 840 may continue until the correction module 430 determines that in the new iteration, the corrected projection images satisfy the condition.

It should be noted that the above description of the process 800 is provided for the purposes of illustration, and is not intended to limit the scope of the present disclosure. For persons having ordinary skills in the art, multiple variations and modifications may be made under the teachings of the present disclosure. However, those variations and modifications do not depart from the scope of the present disclosure.

In some embodiments, in an iteration, the processing device 140 may execute the process 800 to return to step 830 after step 860. In some embodiments, step 820 may be omitted. In 830, the correction module 430 may correct the projection images obtained in 810 to generate a plurality of corrected projection images. In some embodiments, the order of the steps of the process 800 may be changed. For example, the beam hardening correction and/or scattering correction in step 820 may be performed after step 830 to post-process the corrected projection images. In 840, the correction module 430 may determine whether the post-processed corrected projection images satisfy the condition. As another example, the beam hardening correction and/or scattering correction in step 820 may be omitted. In response to a result of the determination that the corrected projection images satisfy the condition, the processing device 140 may perform beam hardening correction and/or scattering correction on the corrected projection images to post-process the corrected projection images. In 850, the reconstruction module 440 may reconstruct a CT image of the subject based on the plurality of post-processed corrected projection images.

FIG. 9 illustrates a relationship between two exemplary gantry angles according to some embodiments of the present disclosure. As illustrated in FIG. 9, the X-ray emitted by the radiation source 113 at position A toward position B (i.e., X-ray AB) is collinear with the X-ray emitted by the radiation source 113 at position B toward position A (i.e., X-ray BA). The gantry angle of the CT scanner 110 may be $\beta_1$ when the radiation source 113 is at position A. The gantry angle of the CT scanner 110 may be $\beta_2$ when the radiation source 113 is at position B. The gantry angle $\beta_2$ may be referred to as an opposite gantry angle of the gantry angle corresponding to X-ray AB as described in connection with FIG. 7. In some embodiments, the gantry angle $\beta_2$ may be determined based on the gantry angle according to Equation (3) below:

$$\beta_1=\beta_2+2\times\gamma+\pi, \quad (3)$$

where $\gamma$ (shown in FIG. 9) represents an intersection angle between X-ray AB and a line connecting position A and the rotation center O of the CT scanner 110, or an intersection angle between X-ray BA and a line connecting position B and the rotation center O of the CT scanner 110. The angular unit of Equation (3) is the radian.

Figure 10:
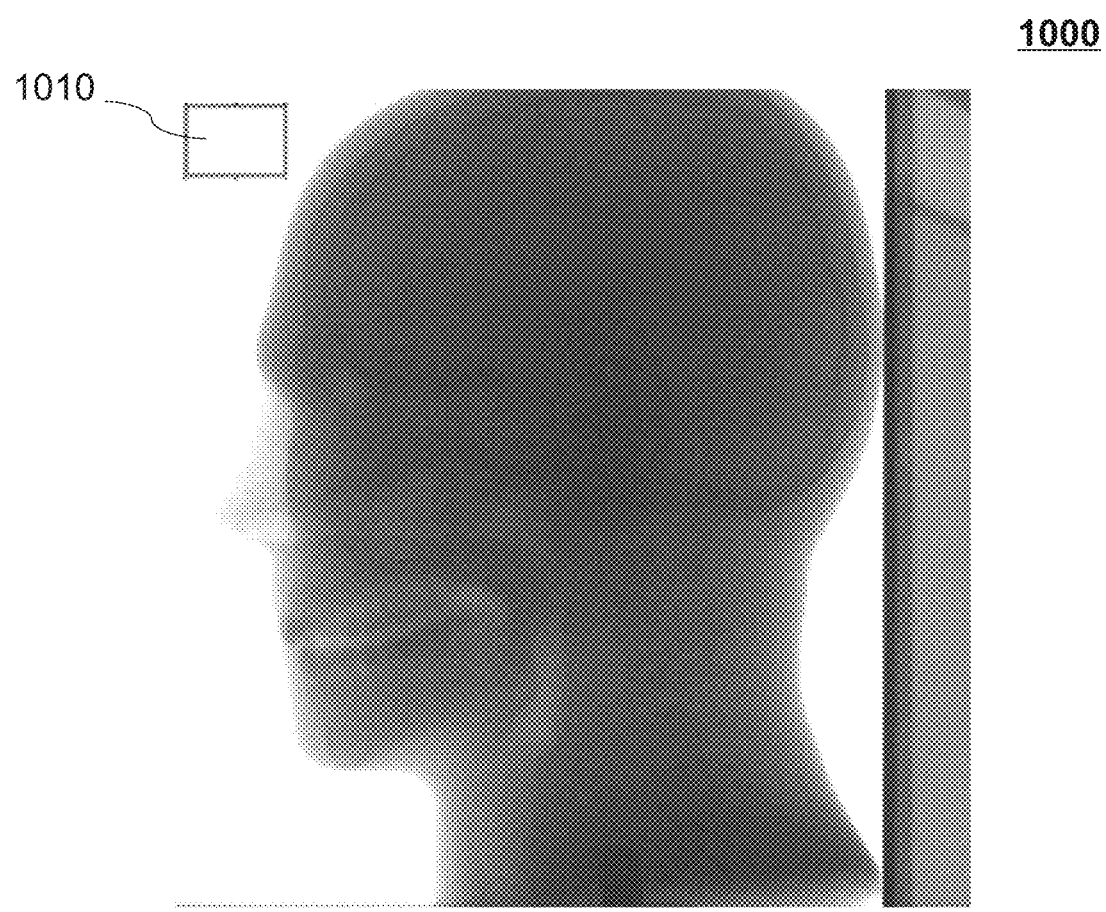
FIG. 10 illustrates an exemplary CT image of a subject according to some embodiments of the present disclosure.

FIG. 10 illustrates an exemplary CT image of a subject according to some embodiments of the present disclosure. The CT image may be generated based on a plurality of projection images of the subject. The projection images may correspond to a plurality of gantry angles as described elsewhere in this disclosure (e.g., step 510 and the relevant descriptions). The projection images may be corrected and/or normalized to reduce the effect of uneven radiation doses at different gantry angles. The CT image may be reconstructed based on the corrected and/or normalized projection images.

In some embodiments, the processing device 140 may correct the projection images by performing exemplary methods described in the present disclosure (e.g., the process 500 or the process 800). As another example, the processing device 140 may correct the projection images based on reported doses delivered to the subject at the plurality of gantry angles. A reported dose delivered to the subject at a gantry angle may be obtained from an ionization chamber when the CT scanner 110 scans the subject at the gantry angle. For illustration purposes, the corrected projection images generated based on exemplary methods described in the present disclosure are referred to as third corrected projection images, and the corrected projection images generated based on reported doses are referred to as fourth corrected projection images.

Figure 11:
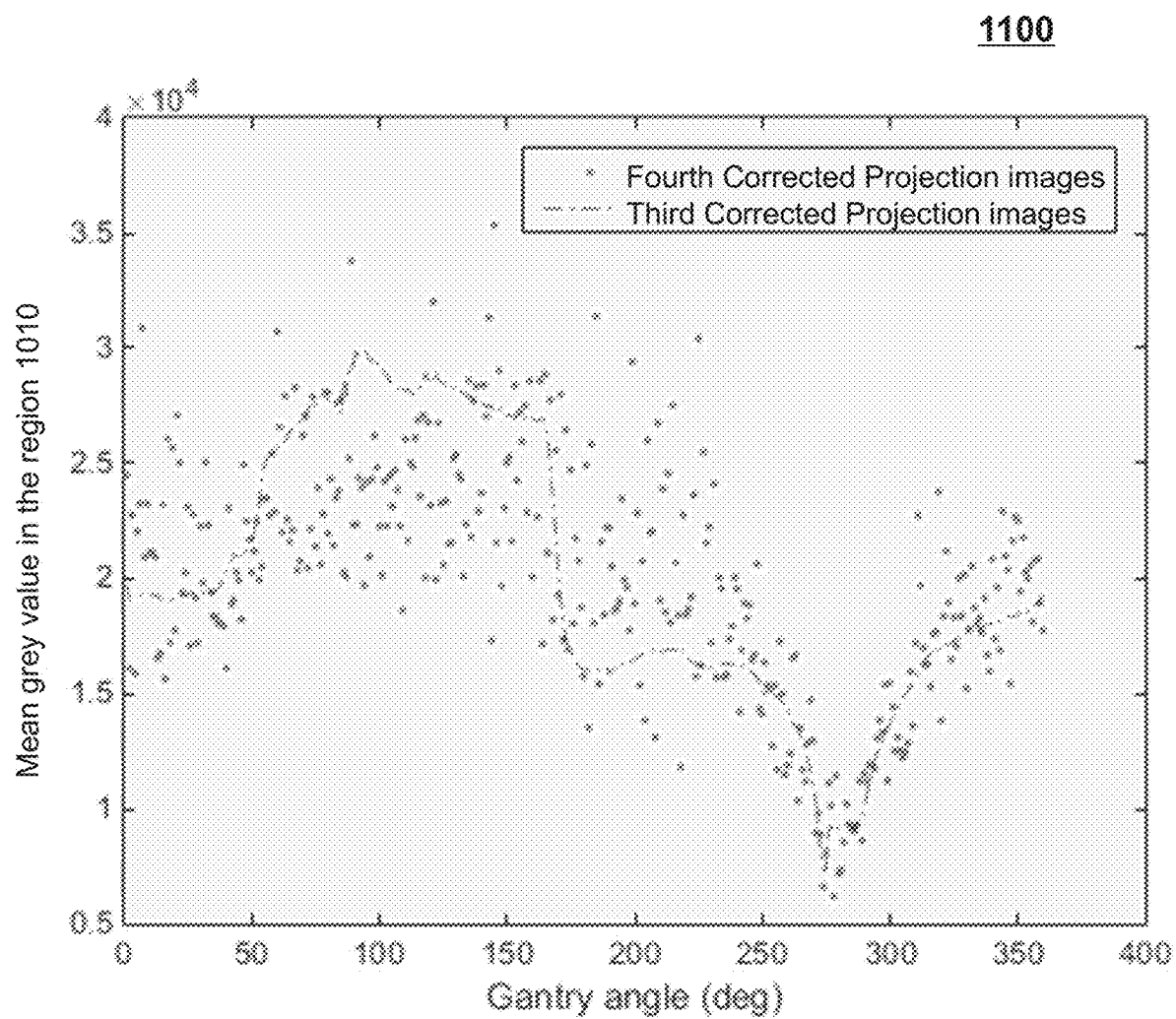
FIG. 11 illustrates the mean pixel values in a region in corrected projection images according to some embodiments of the present disclosure.

The CT image includes a region 1010 as illustrated in FIG. 10. For each of the third and fourth corrected projection images, the processing device 140 may determine a mean grey value of the pixels in the region 1010. FIG. 11 illustrates mean pixel values of the region 1010 in corrected projection images according to some embodiments of the present disclosure. The horizontal axis represents the gantry angle corresponding to a corrected projection image, and the vertical axis represents the mean pixel value of pixels in the region 1010 of the corrected projection image. The points in the dash dot line represent the mean pixel values of the region 1010 in the third corrected projection images. The scattered points represent the mean pixel values of the region 1010 in the fourth corrected projection images. As shown in FIG. 11, the mean pixel values of the region 1010 in the third corrected projection images have a less obvious fluctuation than those in the fourth corrected projection images, which indicates that the third corrected projection images are more consistent than the fourth corrected projection images.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
a storage device storing a set of instructions; and
at least one processor in communication with the storage device, wherein when executing the set of instructions, the at least one processor is configured to cause the system to:
obtain a plurality of projection images of a subject, the plurality of projection images being generated according to scan data acquired by a CT scanner at a plurality of gantry angles, each of the plurality of projection images corresponding to one of the plurality of gantry angles; and
correct the plurality of projection images by performing one or more iterations, an iteration of the one or more iterations including:
correcting the plurality of projection images in the iteration to generate a plurality of corrected projection images;
determining whether the plurality of corrected projection images in the iteration satisfy a condition; and
in response to determining that the plurality of corrected projection images fail to satisfy the condition, designating the plurality of corrected projection images in the iteration as the plurality of projection images in a next iteration.

2. The system of claim 1, wherein
the iteration further comprises: in response to determining that the plurality of corrected projection images satisfy the condition, terminating the one or more iterations, and
the at least one processor is further configured to cause the system to:
reconstruct, based on the plurality of corrected projection images, a CT image of the subject.

3. The system of claim 1, wherein a first projection image of the plurality of images is corrected according to a process for generating a corrected projection image, the first projection image corresponding to a first gantry angle of the plurality of gantry angles, the process including:
generating a corrected first projection image corresponding to the first gantry angle by performing a first correction on the first projection image based on a second projection image of the plurality of projection images, the second projection image corresponding to a second gantry angle of the plurality of gantry angles.

4. The system of claim 3, wherein the second gantry angle is a neighboring gantry angle of the first gantry angle.

5. The system of claim 3, wherein the performing the first correction on the first projection image comprises:
determining, based on a difference between the first projection image and the second projection image, a first correction coefficient of the first projection image; and
performing the first correction on the first projection image based on the first correction coefficient.

6. The system of claim 5, wherein the difference between the first projection image and the second projection image is a difference between grey information of the first projection image and grey information of the second projection image.

7. The system of claim 3, wherein a preliminary corrected first projection image is generated by the first correction, the corrected first projection image is generated by further performing a second correction on the preliminary corrected first projection image, and the second correction comprises:
identifying one or more pixels in the preliminary corrected first projection image, the one or more identified pixels corresponding to a middle-channel of the CT scanner at the first gantry angle;
for each pixel of the one or more pixels, identifying an opposite pixel corresponding to the each pixel of the one or more pixels; and
generating the corrected first projection image corresponding to the first gantry angle based on the one or more pixels and the one or more opposite pixels.

8. The system of claim 7, wherein the generating the corrected first projection image corresponding to the first gantry angle based on the one or more pixels and the one or more opposite pixels comprises:
generating, based on the one or more opposite pixels of the one or more pixels, a reference image of the preliminary corrected first projection image;
determining, based on a difference between the one or more pixels and the reference image, a second correction coefficient of the preliminary corrected first projection image; and
generating, based on the second correction coefficient and the preliminary corrected first projection image, the corrected first projection image corresponding to the first gantry angle.

9. The system of claim 3, wherein the generating a corrected first projection image comprises:
preprocessing the first projection image to generate a preprocessed first projection image, the preprocessing of the first projection image including at least one of a beam hardening correction or a scattering correction; and
generating the corrected first projection image by performing the first correction on the preprocessed first projection image.

10. The system of claim 3, wherein the process further comprises:
post-processing the corrected first projection image, the post-processing of the corrected first projection image including at least one of a beam hardening correction or a scattering correction.

11. A method implemented on a computing device having at least one processor and at least one storage device, the method comprising:
obtaining a plurality of projection images of a subject, the plurality of projection images being generated according to scan data acquired by a CT scanner at a plurality of gantry angles, each of the plurality of projection images corresponding to one of the plurality of gantry angles; and correcting the plurality of projection images by performing one or more iterations, an iteration of the one or more iterations including:
  correcting the plurality of projection images in the iteration to generate a plurality of corrected projection images;
  determining whether the plurality of corrected projection images in the iteration satisfy a condition; and
  in response to determining that the plurality of corrected projection images fail to satisfy the condition, designating the plurality of corrected projection images in the iteration as the plurality of projection images in a next iteration.

12. The method of claim 11, wherein
the iteration further comprises: in response to determining that the plurality of corrected projection images satisfy the condition, terminating the one or more iterations, and
the method further comprises:
  reconstructing, based on the plurality of corrected projection images, a CT image of the subject.

13. The method of claim 11, wherein a first projection image of the plurality of images is corrected according to a process for generating a corrected projection image, the first projection image corresponding to a first gantry angle of the plurality of gantry angles, the process including:
  generating a corrected first projection image corresponding to the first gantry angle by performing a first correction on the first projection image based on a second projection image of the plurality of projection images, the second projection image corresponding to a second gantry angle of the plurality of gantry angles.

14. The method of claim 13, wherein the second gantry angle is a neighboring gantry angle of the first gantry angle.

15. The method of claim 13, wherein the performing the first correction on the first projection image comprises:
  determining, based on a difference between the first projection image and the second projection image, a first correction coefficient of the first projection image; and
  performing the first correction on the first projection image based on the first correction coefficient.

16. The method of claim 15, wherein the difference between the first projection image and the second projection image is a difference between grey information of the first projection image and grey information of the second projection image.

17. The method of claim 13, wherein a preliminary corrected first projection image is generated by the first correction, the corrected first projection image is generated by further performing a second correction on the preliminary corrected first projection image, and the second correction comprises:
  identifying one or more pixels in the preliminary corrected first projection image, the one or more identified pixels corresponding to a middle-channel of the CT scanner at the first gantry angle;
  for each pixel of the one or more pixels, identifying an opposite pixel corresponding to the each pixel of the one or more pixels; and
  generating the corrected first projection image corresponding to the first gantry angle based on the one or more pixels and the one or more opposite pixels.

18. The method of claim 17, wherein the generating the corrected first projection image corresponding to the first gantry angle based on the one or more pixels and the one or more opposite pixels comprises:
  generating, based on the one or more opposite pixels of the one or more pixels, a reference image of the preliminary corrected first projection image;
  determining, based on a difference between the one or more pixels and the reference image, a second correction coefficient of the preliminary corrected first projection image; and
  generating, based on the second correction coefficient and the preliminary corrected first projection image, the corrected first projection image corresponding to the first gantry angle.

19. The method of claim 13, wherein the generating a corrected first projection image comprises:
  preprocessing the first projection image to generate a preprocessed first projection image, the preprocessing of the first projection image including at least one of a beam hardening correction or a scattering correction; and
  generating the corrected first projection image by performing the first correction on the preprocessed first projection image.

20. A non-transitory computer readable medium, comprising a set of instructions, wherein when executed by at least one processor, the set of instructions direct the at least one processor to effectuate a method, the method comprising:
  obtaining a plurality of projection images of a subject, the plurality of projection images being generated according to scan data acquired by a CT scanner at a plurality of gantry angles, each of the plurality of projection images corresponding to one of the plurality of gantry angles; and
  correcting the plurality of projection images by performing one or more iterations, an iteration of the one or more iterations including:
    correcting the plurality of projection images in the iteration to generate a plurality of corrected projection images;
    determining whether the plurality of corrected projection images in the iteration satisfy a condition; and
    in response to determining that the plurality of corrected projection images fail to satisfy the condition, designating the plurality of corrected projection images in the iteration as the plurality of projection images in a next iteration.

* * * * *